April 6, 1954 V. STAUTH ET AL 2,674,385
HAYLIFT ATTACHMENT
Filed June 9, 1952 4 Sheets-Sheet 1

INVENTORS
Vernon Stauth
BY Francis Doyle
ATTORNEY

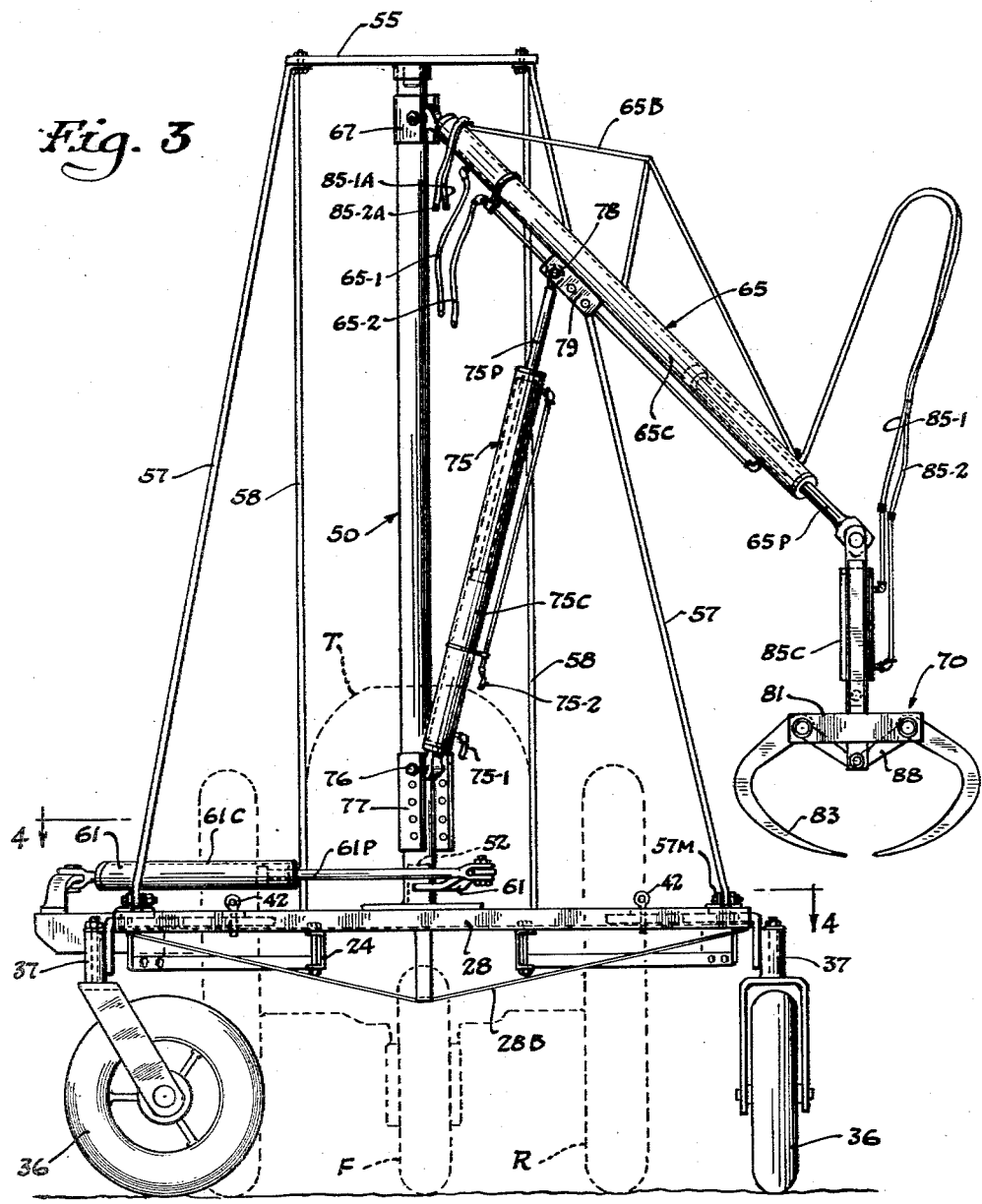

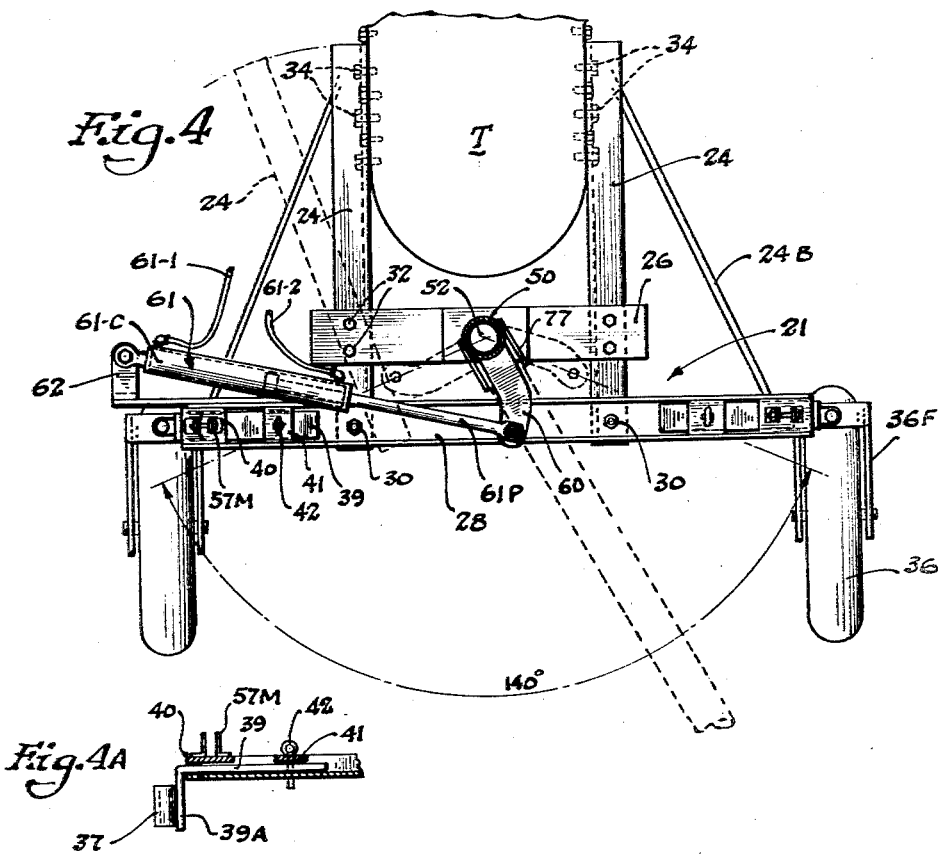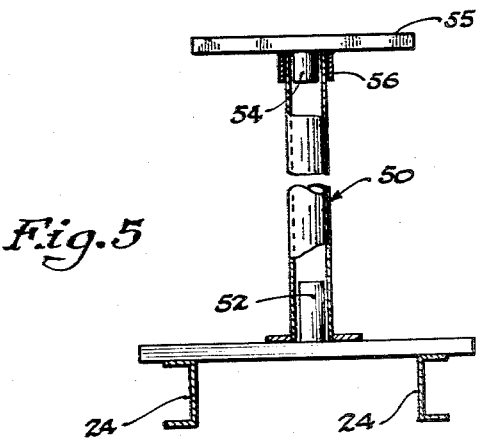

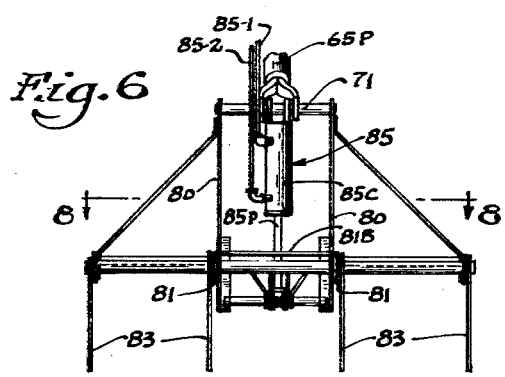
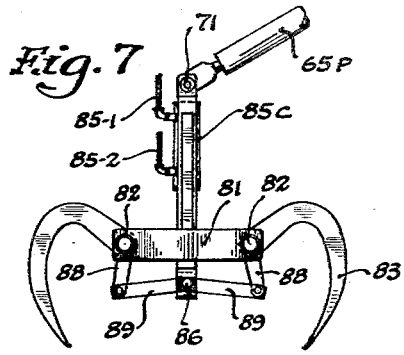
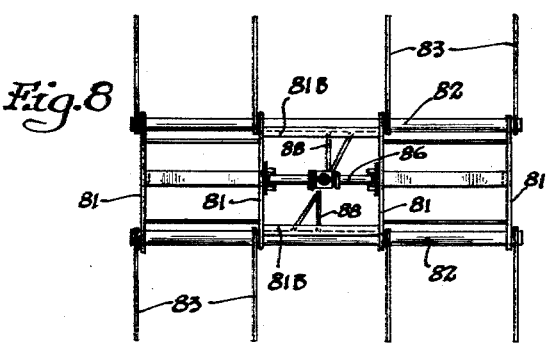
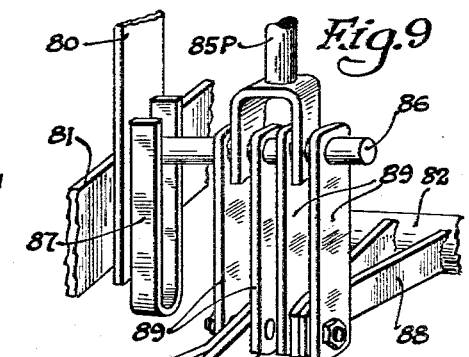
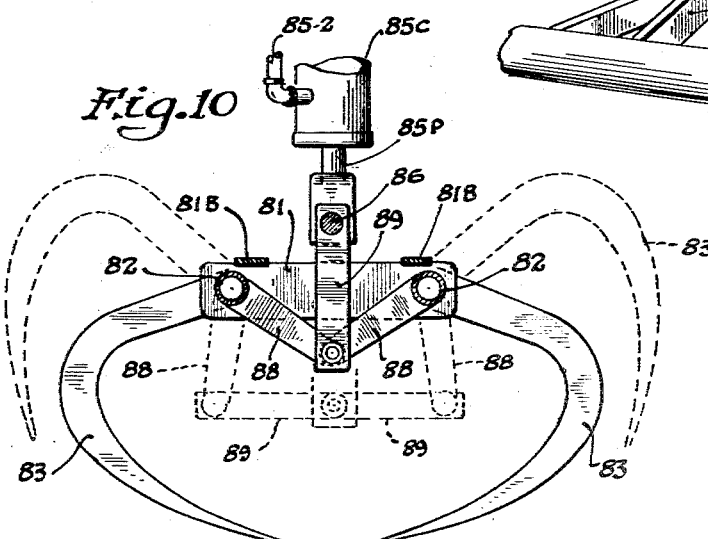

Patented Apr. 6, 1954

2,674,385

UNITED STATES PATENT OFFICE 2,674,385

HAYLIFT ATTACHMENT

Vernon Stauth, Gering, and Francis Doyle, Hemingford, Nebr.

Application June 9, 1952, Serial No. 292,492

3 Claims. (Cl. 214—147)

This invention relates to haylift apparatus, and particularly to such apparatus embodied as an attachment for detachable association with a conventional tractor, or similar wheeled vehicle.

While there are many forms of haylift apparatus that have been commercially produced, such apparatus as heretofore constructed has been quite difficult to use, and, in particular, has been extremely difficult to embody and use as an attachment for tractors and the like. In view of this it is an important object of the present invention to enable haylift apparatus to be so embodied that it may be readily and easily mounted on or removed from an operative relationship with respect to a tractor or the like, and objects related to the foregoing are to afford such a haylift attachment for tractors which is self supporting in a stable relationship when detached from the tractor, and which may be readily and easily connected to the tractor through the use of simple and easily manipulated tools.

Most tractors now used in farm work are provided with hydraulic units for actuating parts of the tractor or attachments that may be associated therewith, and another and important object of the present invention is to afford a haylift attachment that may be readily and easily associated with and operated by the hydraulic system of a conventional tractor.

Other and related objects of the present invention are to afford a haylift that may be used for either loading or unloading operations, as well as for packing operations in respect to hay that has been placed on a rack or stack, and to afford such a haylift wherein the operation is rapid and positive in every instance and under all weather conditions.

Another and related object is to afford a haylift attachment in which many of the loading or unloading operations may be performed without backing or turning movements of the tractor upon which the haylift is mounted, thus to adapt the unit for convenient use during rainy or muddy weather where the movement of the tractor under load is difficult or must be minimized.

Another object of the present invention is to afford a haylift attachment for tractors wherein means are afforded which provide a wide and stable base for the attachment, but which nevertheless provide for free and easy movement of the tractor and the attachment, as may be required.

More specifically, it is an object of the present invention to afford a wheeled base on the haylift attachment whereby these wheels may follow and conform with the steering movements that are imparted to the front wheels of the tractor.

Other and further objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:

Fig. 3 is a front elevational view of the haylift attachment shown in its operative relationship to a tractor and with the boom of the haylift partially elevated;

Fig. 4 is a fragmentary planned view, taken substantially along the line 4—4 of Fig. 3;

Fig. 4A is a fragmental cross sectional view of a portion of the apparatus shown in Fig. 4;

Fig. 5 is a fragmentary vertical sectional view illustrating the construction of the main post of the haylift;

Fig. 6 is a front elevational view of the power operated hayfork;

Fig. 7 is an end elevational view of the hayfork;

Fig. 8 is a planned view taken substantially along the line 8—8 of Fig. 6;

Fig. 9 is a fragmental perspective view showing details of the fork operating mechanism; and Fig. 10 is an enlarged end view of the fork showing the parts thereof in different positions.

Figure 1:
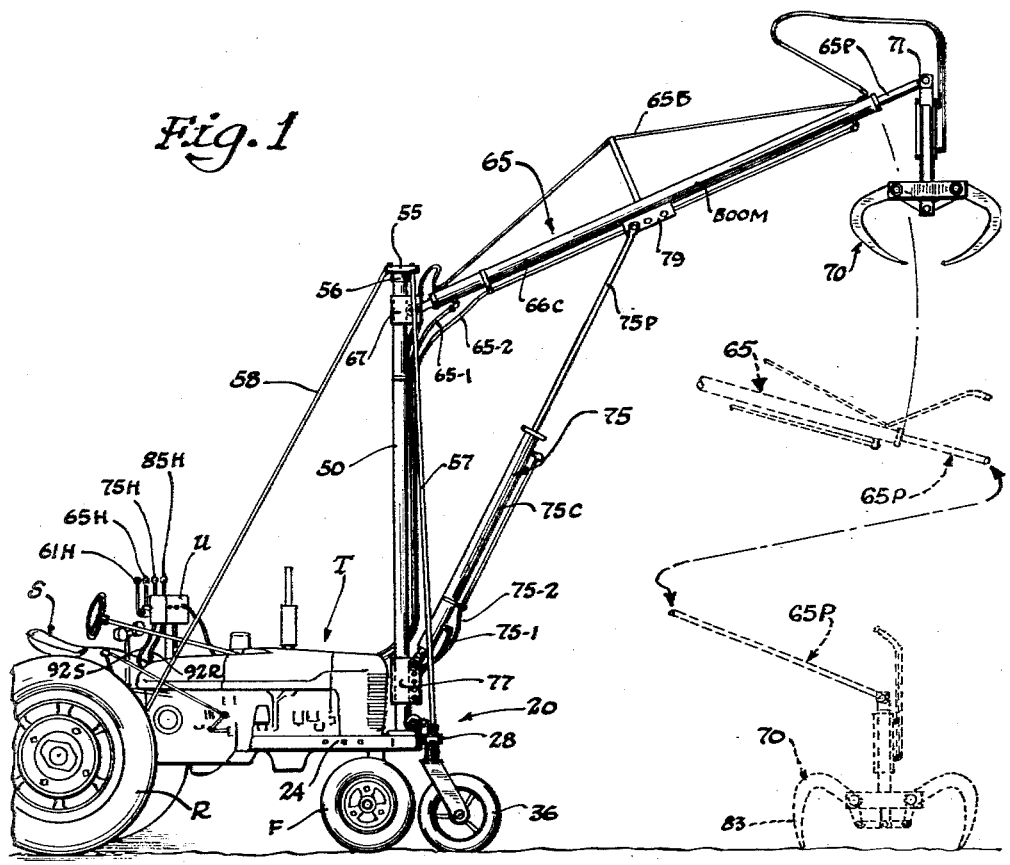
Fig. 1 is a side elevational view of a tractor having a haylift attachment associated therewith, and embodying the features of the invention.
Figure 2:
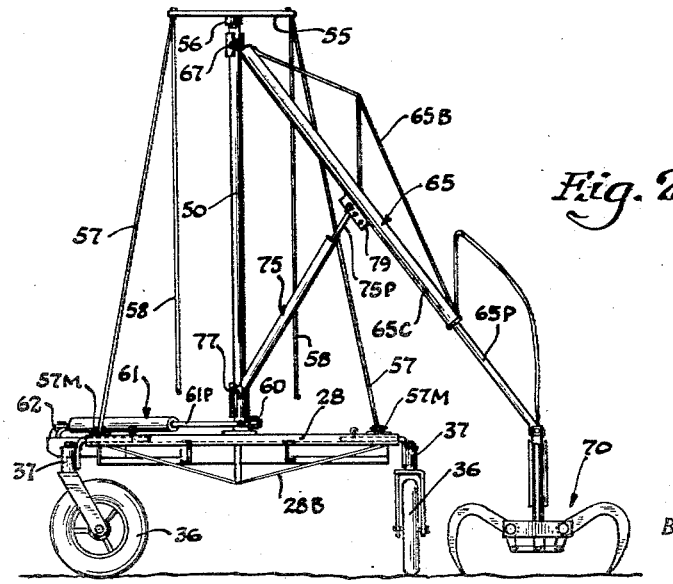
Fig. 2 is a front elevational view of the haylift attachment standing in its storage or rest position and removed from its operative relationship with respect to the tractor.

For purposes of disclosure, the invention is herein illustrated as embodied in a haylift attachment 20, and in Fig. 1 of the drawings the haylift attachment 20 is illustrated as it appears in its operative relationship with respect to a conventional farm tractor T. Such tractors T ordinarily embody a hydraulic system for operating and adjusting various attachments that may be associated with a tractor, and such hydraulic system is utilized in the operation and control of the haylift attachment 20 of the present invention. The tractor T has rear wheels R, and has a conventional form of single front wheel F, and the haylift attachment 20 of the present invention is adapted to be associated with the frame of the tractor T at the forward end of the tractor so that the operator may utilize the haylift while sitting in the seat S of the tractor, a hydraulic control unit U being afforded as an element of the present haylift attachment, and being mounted on a conventional supporting bracket adjacent to and slightly forwardly of the seat S.

The haylift attachment 20 of the present invention afforded by a main mounting frame 21 that is shown in some detail in Figs. 1 to 4, and this frame comprises a pair of side plates 24 formed from channel iron, as shown in Fig. 5, and having a pair of parallel cross beams 26 and 28 extended transversely across the upper flanges of the side plates 24. The front beam 28 is formed from a relatively heavy channel iron member and is disposed with the flanges thereof extended upwardly while the web thereof rests and the side rails 24, and the beam 28 extend a substantial distance in opposite direction beyond the side plates 24, and bolts 30 are utilized to connect the cross beam 28 to the upper flanges of the side plates 24 near the forward ends thereof. The front beam 28 is preferably provided with a bracing structure 28B. The rear cross beam 26 is spaced somewhat rearwardly of the cross beam 28, and extends but a short distance outwardly beyond the respective side plates 24, and this beam is connected by bolts 32 at each end thereof to the upper flanges of the respective side plates 24.

The two side plates 24 are arranged to extend rearwardly along the conventional tractor frame members that are located just below the engine portion of the track, and these frame members are conventionally provided with a plurality of bolt openings. The side plates 24 are, therefore, attached to the tractor frame by a plurality of bolts 34 so that the haylift frame 21 that is thus afforded will extend horizontally forwardly from the front end of the tractor T. Additional rigidity in the mounting is afforded by rigid braces 35 extending rearwardly from the ends of the cross bar 28 and adapted to be connected to the opposite sides of the tractor frame. The frame 21 is provided under the present invention with a safety stabilizing means in the form of a pair of relatively large caster wheels 36, the forks 36F of which have their pivot studs extended upwardly through and detachably secured in mounting sleeves 37 that are provided on the downwardly extending arm 38A of mounting brackets 39. These mounting brackets 39, as shown in Figs. 4 and 4A, have the other arms thereof extended into the space beneath mounting strips 40 and 41 that are welded in position across or between the flanges of the cross beam 28 and spaced from the web of such beam so as to receive the arms of the brackets 39. A large cotter pin 42 extended through the bracket 41 and the bracket 39 serves to hold each such bracket in place with the wheels 36 extending downwardly from opposite ends of the cross beam 28. The mounting of such caster wheels 36 is, under the present invention, arranged so that these wheels 36 will normally be spaced approximately one inch above the surface of the ground upon which the tractor T rests, and the purpose of this will appear hereinafter.

The haylift attachment 20 is provided with an upstanding post 50 that is rotatably mounted on a vertical axis centrally of the cross beam 26, and this vertical axis is afforded by an upwardly extending pivot pin 52 secured to the cross beam 26 as by welding. At its upper end, the post 50 has a pivot pin 54 extended thereinto, and the upper end of the pin 54 is connected to a top plate 55, and this top plate 55 has a water-sealing ring 56 secured to its under surface and extending downwardly about the outer surface of the post 50 so as to prevent entry of water into the inside of the post 50. The top plate 55 is utilized as an anchoring means for downwardly extended rigid braces 57 that are afforded by pipe section which extend outwardly and forwardly, and which are anchored at their lower ends in mounting bracket structures 57M provided on the respective cross straps 40 at the ends of the cross beams 28. Additional anchoring pipes or braces 58 are extended downwardly and rearwardly from the ends of the cross plate 55, and are adapted to be secured to the tractor frame adjacent to the rear portions thereof so that the post 50 will be held securely in the desired vertical relationship with respect to the frame 21.

The post 50 has an arm 60 extended generally radially therefrom near the lower end therefrom, and this arm 60 is connected to the extended end of a piston 61P of a double acting piston and cylinder device 61, the cylinder 61C of which is pivotally anchored on a bracket 62 secured to the front cross beam 28 at the left hand end thereof, as shown in Fig. 4. Thus, by actuation of the piston and cylinder device 61 in opposite directions, the post 50 may be moved through a substantial range of arcuate adjustment which, as indicated in Fig. 4 of the drawings, is substantially 140°. This pivotal movement of the post 50 is utilized to swing the haylifting and moving structure, and, as shown particularly in Figs. 1, 2 and 3 of the drawings, this structure includes an extendable boom 65. The boom 65 comprises a piston and cylinder device having the cylinder 65C thereof pivoted on a horizontal axis 67A on a bracket 67 fixed to the post 50 adjacent to the upper end of the post. The cylinder 65C has a brace structure 65B on its upper side, and the piston rod 65P is adapted to be projected for a substantial distance from the outboard end of the cylinder 65C so as to extend the boom 65 considerably beyond the length shown in Fig. 1. At its outer end the piston rod 65P has a power-operated hay fork 70 mounted in a suspended relation by a pivot 71, and the structure and operation of the fork 70 will be described in detail hereinafter.

The boom 65 is adapted to be actuated by power means through both raising and lowering movements about its pivotal axis 67A, and for this purpose a double-acting piston and cylinder device 75 has its cylinder 75C pivoted at one end by a horizontal pivot pin 76 to a bracket 77 fixed on the post 50 near the lower end of the post, and the piston rod 75P which projects from the other cylinder 75C is pivoted by a horizontal pivot 78 to a bracket 79 fixed to the lower side of the boom cylinder 65C at about the midpoint thereof. The brackets 77 and 79 are provided with several spaced pivot-mounting openings whereby the pivots 76 and 78 may be put in different positions, thereby to change the leverage between the parts and at the same time vary the height to which the boom 65 may be raised.

The hayfork 70 comprises a pair of vertical bars 80 fixed to the opposite ends of the upper pivot rod 71, and at their lower ends the bars 80 each have a cross bar 81 fixed thereto. Near their opposite ends, the cross bars 81 are connected by braces 81B, thus to provide a substantially square frame at the lower ends of the vertical bars 80. Adjacent the ends of the cross bars 81 and beneath the braces 81B, the cross bars 81 have parallel hollow rock shafts 82 mounted therein. These rock shafts 82 are in parallel spaced relation, and each rock shaft has a plurality of hayfork elements or tines 83 fixed thereon so that by rocking movement of the shafts 82, the tines 83 may be moved from their engaging relationship shown in full lines in Fig. 10 to their separated or released positions, shown in dotted outline in Fig. 10.

Such engaging and releasing movements are imparted to the tines 83 by power means in the form of a double acting piston and cylinder device 85, which has its cylinder 85C suspended at its upper end from the cross arm or pivot 71, as shown in Figs. 6 and 7. The piston and cylinder device 85 has its piston rod 85P extended downwardly and pivotally to a cross pin 86, which has its opposite ends slidably guided in vertical guideways 87 that are fixed on the inner sides of the vertical bars 80, as shown in Fig. 9 of the drawings. Thus, by actuation of the piston and cylinder device 85, the cross pin 86 may be moved up and down along the guideway members 87, and such movement is arranged to impart the desired rocking movements to the rock shafts 82. Thus each rock shaft 82 has a rigid arm 88 connected thereto and extended therefrom in a radial direction with respect to the rock shaft 82. The angular relationship of the arms 88 is such that when the tines 83 are in their closed position of Fig. 10, the arms 88 will be located in substantially the full line position shown in Fig. 10. A connection is afforded between the cross pin 86 and each of the arms 88 so that when the piston rod 85P is moved downwardly, the arms 88 will be rocked downwardly and outwardly to the dotted line positions shown in Fig. 10, and to accomplish this each arm 88 is connected to the cross pin 86 by a pair of links 89, as best shown in Figs. 9 and 10. With this arrangement, actuation of the piston rod 85P in a downward direction serves to move the tines 83 to their released positions of Fig. 10, while upward movement of the piston rod 85P serves to move the tines 83 to their engaging positions, and such movement is positive and may be quickly accomplished in every instance.

The control unit U that is illustrated in Fig. 1 of the drawings, may be of a conventional form and is provided with four control handles, 61H, 65H, 75H and 85H, which are allocated to the control of the similarly numbered piston and cylinder devices, and, in accordance with usual practice, these controlling handles may be actuated in a forward direction to cause the related piston and cylinder device to be operated in one direction, while actuation of such control handles in the opposite direction will cause movement of the related piston and cylinder device in the opposite direction.

The hydraulic control unit U is provided with a pair of connecting hoses 92S and 92R that constitute the supply and return lines from the hydraulic supply unit of the tractor T, and such lines 92S and 92R must, of course, be properly connected when the haylift attachment is being put in place on the tractor, and must similarly be disconnected in the course of detachment of the haylift unit. It should be pointed out, however, that hydraulic connections afforded between the control unit U and the respective operating cylinders of the haylift unit are maintained connected at all times so that the hydraulic fluid of the haylift attachment is retained in the system.

With respect to the hydraulic cylinder 61, a pair of flexible connections 61-1 and 61-2 are provided from opposite ends of the cylinder 61C, and these connections are extended to the unit U in an operative or controlled relationship with respect to the control handle 61H. Similarly, the boom cylinder 65 has a pair of connections 65-1 and 65-2, and preferably a portion of the connection 65-2 is afforded by a rigid pipe extended along the lower surface of the cylinder 65C. The connections 65-1 and 65-2 are extended to the control unit U and are operatively associated with the control handle 65H. Similarly, the piston cylinder 75 has flexible connections 75-1 and 75-2 extended thereto and a portion of the line 75-2 is afforded by a rigid pipe extended along one side of the cylinder 75C. The connections 75-1 and 75-2 are extended to the unit U, and are operatively associated with the control handle 75H. The fork-operating piston and cylinder device 85 also has flexible control lines 85-1 and 85-2 extended thereto, and, as shown in Fig. 3 of the drawings, these flexible lines include a sufficient amount of slack to enable the boom 65 to be extended. The flexible connections 85-1 and 85-2 are, in the present instance, extended to the pivot end of the boom 65 by means of pipes, which also form structural elements of the brace structure 65B, and from the inner ends of these pipes, the connections are extended by flexible connections 85-1A and 85-2A that extend to the control unit U, and are operatively associated with the control handle 85H.

In practice, the various actuating cylinders are each painted a different color and the control handles of the control unit U are painted in corresponding colors so that ease of operation and control is assured. With the mechanism thus arranged, the operator may sit on the seat S of the tractor, and by operation of the various control handles may accomplish rapid loading or unloading of hay, and may accomplish packing operations in respect to hay that is being placed on a stack or a rack. These operations may be performed without requiring movement of the tractor, thus to facilitate use of the apparatus on muddy surfaces or the like. The boom 65 may, of course, be extended for a considerable distance, and in practice we have found that a five foot stroke in the piston and cylinder device 65 gives a very satisfactory range of boom extension. Thus, when the fork is loaded in a retracted relation, the boom may be raised to a level above a stack, and may then be extended so as to place the load above the stack. The piston and cylinder device 85 may then be positively operated to cause quick release of the load, and after the load has been dropped, the boom 65 may be lowered by operation of the piston and cylinder device 75 so as to impart a tamping or packing action to the load that has been thus placed on top of the stack. The boom, of course, may be moved through swinging movements by means of the piston and cylinder device 61, and such movements may be used in shifting the fork into position over a stack. The wide range of movements that may be imparted to this haylift attachment enable the apparatus to be used with extremely high efficiency, and since all the elements are positively actuated in both directions, the unit is adapted for efficient operation even in cold weather, or under other adverse circumstances.

The haylift attachment of the present invention is particularly valuable insofar as it facilitates mounting or dismounting of the attachment in respect to the tractor. The caster wheels 36 of course serve at all times to give a high degree of stability to the unit under load, and when the operator finds it necessary to move the associated tractor and haylift unit, he is assured that the close proximity of the caster wheels 36 to the ground surface will prevent tipping of the haylift. When it is desired to detach the haylift unit from the tractor, it is usually sufficient to detach the braces 58, remove the bolts 34, and simply back the tractor in a rearward direction so as to withdraw the tractor frame from between the side plates 24. As a preliminary to this operation, the operator places relatively small boards or the like beneath the two caster wheels 36 which, as above pointed out, are arranged to ride just slightly above the ground surface. The operator also lowers the boom 65 to the dotted line position shown in Fig. 1, and preferably this is done with the tines 83 of the fork in their open position so that these tines will penetrate the ground and serve as more or less of an anchor for the unit to prevent undesired movements thereof along the ground. Thus the haylift attachment has at this time what amounts to a three point engagement with the ground, these points of contact being afforded by the two wheels 36 and the tines 83 which will, of course, penetrate the ground in a more or less equalized relation. The haylift attachment then constitutes a stable structure, and the bolts 34 and braces 35 and 58 may be detached and the tractor backed slightly rearwardly to separate the tractor from the side plates 24 of the haylift attachment. The supply and return connections 92S and 92R are then disconnected from the hydraulic supply unit of the tractor, and the control unit U, with all of its control handles in neutral positions, is removed from its mounted relation on the tractor and is placed on the frame structure of the haylift attachment, as for example on the cross bar 26 of such frame.

In respect to some models or types of tractors, it should be noted that the frames are provided with projecting bosses which surround the holes that are to receive attachment bolts such as the bolts 34, and these bosses are arranged to project through or into the openings of the side of frame plates 24. In such an instance, a special releasing operation is required and this involves disconnection of a brace 35, removal of the fastening bolts 32 on one of the side plates 24, and after this has been done, the side plate 24 may be swung outwardly to the dotted line position shown in Fig. 4. Then by operation of the piston and cylinder device 61, a slight swinging movement may be imparted to the frame of the haylift, it being recalled that at this time the tines 83 of the hayfork 70 are engaged with the ground, and by such operation of the piston and cylinder device 61, so as to further extend or project the piston rod 61P, the right hand side plate 24 may be swung slightly in a clockwise direction, thus to release this side plate from its engagement with projecting bosses of the aforesaid character.

The attachment of the haylift structure to a tractor is, of course, accomplished by the reversal of the procedures above outlined, and in practice it has been found that the haylift attachment may be either mounted or dismounted by one man in a period of fifteen minutes, or less.

From the foregoing it will be apparent that the present invention affords a haylift attachment of wide utility, and which may be easily and conveniently operated to accomplish loading and unloading operations, as well as packing operations in respect to such hay, and all of these operations are attained in a simple and expeditious manner.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:

1. In a haylift attachment for tractors and the like, a main frame comprising a pair of side plates adapted to embrace opposite sides of a tractor frame and to be rigidly secured thereto, a front crossbar and a rear crossbar extended transversely across the forward ends of said side plates and rigidly secured thereto, said front crossbar extending a substantial distance outwardly beyond said side plates, a pair of stabilizing caster wheels secured adjacent the opposite ends of said front cross bar in position to be disposed just slightly above ground level when said side plates are secured to a tractor frame, a main post extended vertically upwardly from the midpoint of said rear crossbar and mounted for rotation about its vertical axis, a top plate mounted on the top of said main post to permit rotation of said main post relative to said top plate, rigid bracing members extended from said top plate downwardly and forwardly to the ends of said front cross bar to maintain said post in vertical position, additional bracing members attached to said top plate and adapted to be extended rearwardly for connection with the frame of a tractor, a main boom comprising a double-acting piston and cylinder device having its piston extending from one end of the cylinder and having the other end of the cylinder pivoted on a horizontal axis on said main post adjacent to the upper end of such post, a hayfork including fork elements movable through engaging and releasing strokes, said hayfork being suspended from the end of said piston rods, a double-acting piston and cylinder device mounted on said hayfork and effective to actuate said fork elements through such engaging and releasing strokes, a double-acting piston and cylinder device connected between said post and said cylinder of said boom at points spaced substantially from the pivot of said boom for imparting power operated raising and lowering movements to said boom, and a double-acting piston and cylinder device connected between one of said cross bars and said main post for imparting rotative movements to said post.

2. In a haylift attachment for tractors and the like, a main frame comprising a pair of side plates adapted to embrace opposite sides of a tractor frame and to be rigidly secured thereto, a front crossbar and a rear crossbar extended transversely across the forward ends of said side plates and rigidly secured thereto, said front crosbar extending a substantial distance outwardly beyond said side plates, a pair of stabilizing caster wheels secured adjacent the opposite ends of said front cross bar in position to be disposed just slightly above ground level when said side plates are secured to a tractor frame, a main post extended vertically upwardly from the midpoint of said rear cross-bar and mounted for rotation about its vertical axis, a top plate mounted on the top of said main post to permit rotation of said main post relative to said top plate, rigid bracing members extended from said top plate downwardly and forwardly to the ends of said front cross bar, a main boom comprising a double-acting piston and cylinder device having its piston extending from one end of the cylinder and having the other end of the cylinder pivoted on a horizontal axis on said main post adjacent to the upper end of such post, a hayfork including fork elements movable through engaging and releasing strokes, said hayfork being suspended from the end of said piston rod, a double-acting piston and cylinder device mounted on said hayfork and effective to actuate said fork elements through engaging and releasing strokes, a double-acting piston and cylinder device connected between said boom and said post for imparting power operated raising and lowering movements to said boom, and a double-acting piston and cylinder device connected between one of said crossbars and said main post for imparting rotative movements to said post.

3. In a haylift attachment for tractors and the like, a main frame including parts adapted to be rigidly secured to the frame of a tractor, a pair of stabilizing caster wheels secured adjacent the opposite sides of said main frame in position to be disposed just slightly above ground level when said main frame is secured to a tractor frame, a main post extended vertically upwardly from said main frame and mounted for rotation about its vertical axis, a top plate mounted on the top of said main post to permit rotation of said main post relative to said top plate, bracing members extended from said top plate downwardly in angular relation with respect to said post and connected to said main frame to maintain said post in vertical position, a main boom comprising a double-acting piston and cylinder device having its piston extending from one end of the cylinder and having the other end of the cylinder pivoted on a horizontal axis on said main post adjacent to the upper end of such post, a hayfork including fork elements movable through engaging and releasing strokes, said hayfork being suspended from the end of said piston rod, a double-acting piston and cylinder device mounted on said hayfork and effective to actuate said fork element through engaging and releasing strokes, a double-acting piston and cylinder device connected between said boom and said post for imparting power operated raising and lowering movements of said boom, and a double-acting piston and cylinder device connected between said main frame and said main post for imparting rotative movements to said post so as to thereby swing said boom.

References Cited in the file of this patent
UNITED STATES PATENTS

| Number | Name | Date |
| --- | --- | --- |
| 363,476 | McKee | May 24, 1887 |
| 1,603,573 | Baker | Oct. 19, 1926 |
| 2,410,567 | Christiansen | Nov. 5, 1946 |
| 2,451,101 | Leschinsky | Oct. 12, 1948 |